(12) United States Patent
Shuler et al.

(10) Patent No.: US 10,521,283 B2
(45) Date of Patent: Dec. 31, 2019

(54) IN-NODE AGGREGATION AND DISAGGREGATION OF MPI ALLTOALL AND ALLTOALLV COLLECTIVES

(71) Applicant: Mellanox Technologies, Ltd., Yokneam (IL)

(72) Inventors: Shahaf Shuler, Karkom (IL); Noam Bloch, Bat Shlomo (IL); Gil Bloch, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 187 days.

(21) Appl. No.: 15/446,004

(22) Filed: Mar. 1, 2017

(65) Prior Publication Data

US 2017/0255501 A1    Sep. 7, 2017

Related U.S. Application Data

(60) Provisional application No. 62/304,355, filed on Mar. 7, 2016.

(51) Int. Cl.
*G06F 9/54* (2006.01)

(52) U.S. Cl.
CPC .............. *G06F 9/546* (2013.01); *G06F 9/542* (2013.01); *G06F 2209/547* (2013.01)

(58) Field of Classification Search
None
See application file for complete search history.

(56) References Cited

U.S. PATENT DOCUMENTS

| | | | |
|---|---|---|---|
| 4,933,969 A | * | 6/1990 | Marshall ............... G06F 21/64 340/5.74 |
| 5,068,877 A | | 11/1991 | Near et al. |
| 5,325,500 A | | 6/1994 | Bell et al. |
| 5,353,412 A | | 10/1994 | Douglas et al. |
| 5,404,565 A | | 4/1995 | Gould et al. |
| 5,606,703 A | | 2/1997 | Brady et al. |
| 6,041,049 A | | 3/2000 | Brady |
| 6,507,562 B1 | | 1/2003 | Kadansky et al. |
| 6,857,004 B1 | | 2/2005 | Howard et al. |
| 6,937,576 B1 | | 8/2005 | Di Benedetto et al. |
| 7,102,998 B1 | | 9/2006 | Golestani |
| 7,124,180 B1 | | 10/2006 | Ranous |
| 7,171,484 B1 | | 1/2007 | Krause et al. |
| 7,555,549 B1 | | 6/2009 | Campbell et al. |

(Continued)

OTHER PUBLICATIONS

U.S. Appl. No. 14/937,907 Office Action dated Jun. 19, 2017.

(Continued)

*Primary Examiner* — Umut Onat
(74) *Attorney, Agent, or Firm* — Kligler & Associates

(57) ABSTRACT

An MPI collective operation carried out in a fabric of network elements by transmitting MPI messages from all the initiator processes in an initiator node to designated ones of the responder processes in respective responder nodes. Respective payloads of the MPI messages are combined in a network interface device of the initiator node to form an aggregated MPI message. The aggregated MPI message is transmitted through the fabric to network interface devices of responder nodes, disaggregating the aggregated MPI message into individual messages, and distributing the individual messages to the designated responder node processes.

12 Claims, 6 Drawing Sheets

(56) References Cited

U.S. PATENT DOCUMENTS

| | | | |
|---|---|---|---|
| 7,613,774 | B1 | 11/2009 | Caronni et al. |
| 8,213,315 | B2 | 7/2012 | Crupnicoff et al. |
| 8,761,189 | B2 | 6/2014 | Shachar et al. |
| 8,811,417 | B2 | 8/2014 | Bloch et al. |
| 9,110,860 | B2 | 8/2015 | Shahar |
| 9,344,490 | B2 | 5/2016 | Bloch et al. |
| 9,563,426 | B1* | 2/2017 | Bent .................... G06F 9/3004 |
| 2002/0010844 | A1 | 1/2002 | Noel et al. |
| 2002/0035625 | A1 | 3/2002 | Tanaka |
| 2002/0150094 | A1 | 10/2002 | Cheng et al. |
| 2002/0150106 | A1 | 10/2002 | Kagan et al. |
| 2002/0152315 | A1 | 10/2002 | Kagan et al. |
| 2002/0152327 | A1 | 10/2002 | Kagan et al. |
| 2002/0152328 | A1 | 10/2002 | Kagan et al. |
| 2003/0018828 | A1 | 1/2003 | Craddock et al. |
| 2003/0061417 | A1 | 3/2003 | Craddock et al. |
| 2003/0065856 | A1 | 4/2003 | Kagan et al. |
| 2004/0062258 | A1 | 4/2004 | Grow et al. |
| 2004/0078493 | A1 | 4/2004 | Blumrich et al. |
| 2004/0120331 | A1 | 6/2004 | Rhine et al. |
| 2004/0123071 | A1 | 6/2004 | Stefan et al. |
| 2004/0252685 | A1 | 12/2004 | Kagan et al. |
| 2005/0097300 | A1 | 5/2005 | Gildea et al. |
| 2005/0122329 | A1 | 6/2005 | Janus |
| 2005/0129039 | A1 | 6/2005 | Biran et al. |
| 2005/0131865 | A1 | 6/2005 | Jones et al. |
| 2008/0126564 | A1 | 5/2008 | Wilkinson |
| 2008/0168471 | A1 | 7/2008 | Benner et al. |
| 2008/0288949 | A1 | 11/2008 | Bohra et al. |
| 2009/0037377 | A1 | 2/2009 | Archer et al. |
| 2009/0063816 | A1 | 3/2009 | Arimilli et al. |
| 2009/0182814 | A1 | 7/2009 | Tapolcai et al. |
| 2009/0247241 | A1 | 10/2009 | Gollnick et al. |
| 2009/0292905 | A1 | 11/2009 | Faraj |
| 2010/0049836 | A1 | 2/2010 | Kramer |
| 2010/0074098 | A1 | 3/2010 | Zeng et al. |
| 2011/0258245 | A1 | 10/2011 | BlockSome et al. |
| 2012/0063436 | A1 | 3/2012 | Thubert et al. |
| 2012/0117331 | A1 | 5/2012 | Krause et al. |
| 2013/0159410 | A1 | 6/2013 | Lee |
| 2014/0211804 | A1* | 7/2014 | Makikeni .............. H04L 69/16 370/392 |
| 2015/0193271 | A1* | 7/2015 | Archer .................. G06F 9/4843 718/101 |
| 2015/0269116 | A1 | 9/2015 | Raikin et al. |
| 2016/0105494 | A1* | 4/2016 | Reed .................... G06F 17/14 709/201 |
| 2016/0299872 | A1 | 10/2016 | Vaidyanathan et al. |
| 2017/0063613 | A1 | 3/2017 | Bloch et al. |

OTHER PUBLICATIONS

U.S. Appl. No. 15/250,953 Office Action dated Nov. 2, 2018.

Mellanox Technologies, "InfiniScale IV: 36-port 40GB/s Infiniband Switch Device", 2 pages, 2009.

Mellanox Technologies Inc., "Scaling 10Gb/s Clustering at Wire-Speed", 8 pages, 2006.

IEEE 802.1D Standard "IEEE Standard for Local and Metropolitan Area Networks—Media Access Control (MAC) Bridges", IEEE Computer Society, 281 pages, Jun. 9, 2004.

IEEE 802.1AX Standard "IEEE Standard for Local and Metropolitan Area Networks—Link Aggregation", IEEE Computer Society, 163 pages, Nov. 3, 2008.

Turner et al., "Multirate Clos Networks", IEEE Communications Magazine, 11 pages, Oct. 2003.

Thayer School of Engineering, "An Slightly Edited Local Copy of Elements of Lectures 4 and 5", Dartmouth College, 5 pages, Jan. 15, 1998 hittp://people.seas.harvard.edu/~jones/cscie129/nu_lectures/lecture11/switching/clos_network/clos_network.html.

"MPI: A Message-Passing Interface Standard," Message Passing Interface Forum, version 3.1, 868 pages, Jun. 4, 2015.

Coti et al., "MPI Applications on Grids: a Topology Aware Approach," Proceedings of the 15th International European Conference on Parallel and Distributed Computing (EuroPar'09), 12 pages, Aug. 2009.

Petrini et al., "The Quadrics Network (QsNet): High-Performance Clustering Technology," Proceedings of the 9th IEEE Symposium on Hot Interconnects (HotI'01), 6 pages, Aug. 2001.

Sancho et al., "Efficient Offloading of Collective Communications in Large-Scale Systems," Proceedings of the 2007 IEEE International Conference on Cluster Computing, 10 pages, Sep. 17-20, 2007.

Infiniband Trade Association, "InfiniBand™ Architecture Specification", release 1.2.1, 1727 pages, Jan. 2008.

U.S. Appl. No. 15/250,953 Office Action dated Feb. 15, 2018.

Deming, "Infiniband Architectural Overview", Storage Developer Conference, pp. 1-70, year 2013.

Fugger et al., "Reconciling fault-tolerant distributed computing and systems-on-chip", Distributed Computing, vol. 24, Issue 6, pp. 323-355, Jan. 2012.

Wikipedia, "System on a chip", pp. 1-4, Jul. 6, 2018.

Villavieja et al., "On-chip Distributed Shared Memory", Computer Architecture Department, pp. 1-10, Feb. 3, 2011.

* cited by examiner

IN-NODE AGGREGATION AND DISAGGREGATION OF MPI ALLTOALL AND ALLTOALLV COLLECTIVES

CROSS-REFERENCE TO RELATED APPLICATIONS

This Application claims the benefit of U.S. Provisional Application No. 62/304,355, filed 7 Mar. 2016, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to network arrangements and protocols for real-time communications. More particularly, this invention relates to organizing the transmission of messages in a fabric.

2. Description of the Related Art

The meanings of certain acronyms and abbreviations used herein are given in Table 1.

TABLE 1

| Acronyms and Abbreviations | |
|---|---|
| DLID | Destination LID (Destination Address) |
| HPC | High Performance Computing |
| LID | Local Identifier (Address) |
| MPI | Message Passing Interface |
| NCC | NIC Communicator Controller |
| NIC | Network Interface Card |
| QP | Queue Pair |
| WQE | Work Queue Element |

Message Passing Interface (MPI) is a communication protocol that is widely used for exchange of messages among processes in high-performance computing (HPC) systems. The current MPI standard is published by the MPI Forum as the document *MPI: A Message-Passing Interface Standard*, Ver. 3.1; Jun. 4, 2015, which is available on the Internet and is herein incorporated by reference.

MPI supports collective communication in accordance with to a message-passing parallel programming model, in which data is moved from the address space of one process to that of another process through cooperative operations on each process in a process group. MPI provides point-to-point and collective operations that can be used by applications. These operations are associated with a defined object called a communicator. Communicators provide a mechanism to construct distinct communication spaces in which process groups can operate. Each process group is associated with a communicator and has a communicator identifier that is unique with respect to all processes inside the communicator. There is a default communicator that contains all the processes in an MPI job, which is called MPI_COMM_WORLD.

Typically high performance computing (HPC) systems contains thousands of nodes, each having tens of cores. It is common in MPI to bind each process to a core. When launching an MPI job, the user specifies the number of processes to allocate for the job. These processes are distributed among the different nodes in the system. The MPI operations alltoall and alltoallv are some of the collective operations (sometimes referred to herein as "collectives") supported by MPI. These collective operations scatter or gather data from all members to all members of a process group. In the operation alltoall, each process in the communicator sends a fixed-size message to each of the other processes. The operation alltoallv is similar to the operation alltoall, but the messages may differ in size.

Typically, MPI jobs allocate thousands of processes, spread between thousands of nodes. The number of nodes in an MPI job is denoted as N, and the number of processes in the MPI job as P, which leads to a total number of N*P processes. Thus, in alltoall (or alltoallv) collectives between N*P processes of the MPI job, each process sends (N−1)*P messages to the other different processes. Therefore, each node outputs (N−1)*P^2 messages to the network, leading to a total number of N*(N−1)*P^2 messages in the fabric.

Assuming the value of N to be in the thousands and P in the tens, the number of messages in the fabric creates network congestion and incurs overhead in posting them to the network interface. The overhead becomes especially significant when the message payload is small, as each message requires both MPI and transport headers. Some MPI software implementations attempt to moderate the number of messages, but still do not make optimal use of the bandwidth of the fabric.

SUMMARY OF THE INVENTION

According to embodiments of the invention, network interface controllers (NICs) perform aggregation and disaggregation at the network interface of the different messages to the different processes in MPI alltoall and alltoallv collectives. The NIC aggregates all of the messages destined to each of the processes in the remote nodes from all of the processes on its local node. In addition, when receiving an alltoall message, the NIC disaggregates the message for distribution to the respective processes in the local node. Enabling aggregation and disaggregation in the NIC reduces by a factor of P^2 the number of messages in the fabric in an alltoall collective operation. This leads to better utilization of the fabric bandwidth, since only one transport header is needed. Since fewer messages are posted, there is less I/O overhead.

There is provided according to embodiments of the invention a method of communication, which is carried out in a fabric of network elements including an initiator node and responder nodes, initiating in the initiator node, an MPI (message passing interface) collective operation. The collective operation is conducted by transmitting MPI messages from all the initiator processes in the initiator node to designated ones of the responder processes in respective responder nodes. The method is further carried out by combining respective payloads of the MPI messages in a network interface device of the initiator node to form an aggregated MPI message, transmitting the aggregated MPI message through the fabric to the responder nodes, in respective network interface devices of the responder nodes disaggregating the aggregated MPI message into individual messages, and distributing the individual messages to the designated ones of the responder processes.

According to one aspect of the method, the aggregated MPI message has exactly one transport header that includes a destination address of the aggregated MPI message.

According to a further aspect of the method, the MPI messages comprise respective MPI headers indicating designated responder processes, and the designated responder processes are referenced in an MPI communicator object.

According to yet another aspect of the method, initiating an MPI collective operation includes forwarding by a communication library the MPI communicator object and the payloads to the network interface device of the initiator node.

Still another aspect of the method includes maintaining a communicator context in the network interface device of the initiator node, wherein transmitting the aggregated MPI message includes directing the aggregated MPI message to local identifiers (LIDs) in the responder nodes according to the communicator context.

An additional aspect of the method includes forming the aggregated MPI message by assembling pointers to message data, and including respective local identifier addresses for the message data in the aggregated MPI message.

There is further provided according to embodiments of the invention a communication apparatus, including a fabric of network elements including an initiator node executing initiator processes and responder nodes executing respective responder processes. The initiator node is configured for initiating an MPI collective operation that is conducted by transmitting MPI messages through the fabric from all the initiator processes to designated responder processes. A first network interface device in the initiator node has first communicator controller circuitry configured for combining respective payloads of the MPI messages to form an aggregated MPI message. Respective second network interface devices in the responder nodes have second communicator controller circuitry configured for disaggregating the aggregated MPI message into individual messages. The responder nodes are operative for distributing the individual messages to the designated responder processes.

According to another aspect of the apparatus, the first communicator controller circuitry is operative for forming the aggregated MPI message by assembling pointers to message data, and including respective local identifier addresses for the message data in the aggregated MPI message.

In one aspect of apparatus the first network interface device apparatus is operative for maintaining a communicator context and transmitting the aggregated MPI message by directing the aggregated MPI message to local identifiers (LIDs) in the responder nodes according to the communicator context.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions.

A "switch fabric" or "fabric" refers to a network topology in which network nodes interconnect via one or more network switches (such as crossbar switches), typically through many ports. The interconnections are configurable such that data is transmitted from one node to another node via designated ports. A common application for a switch fabric is a high performance backplane.

System Architecture.

Figure 1:
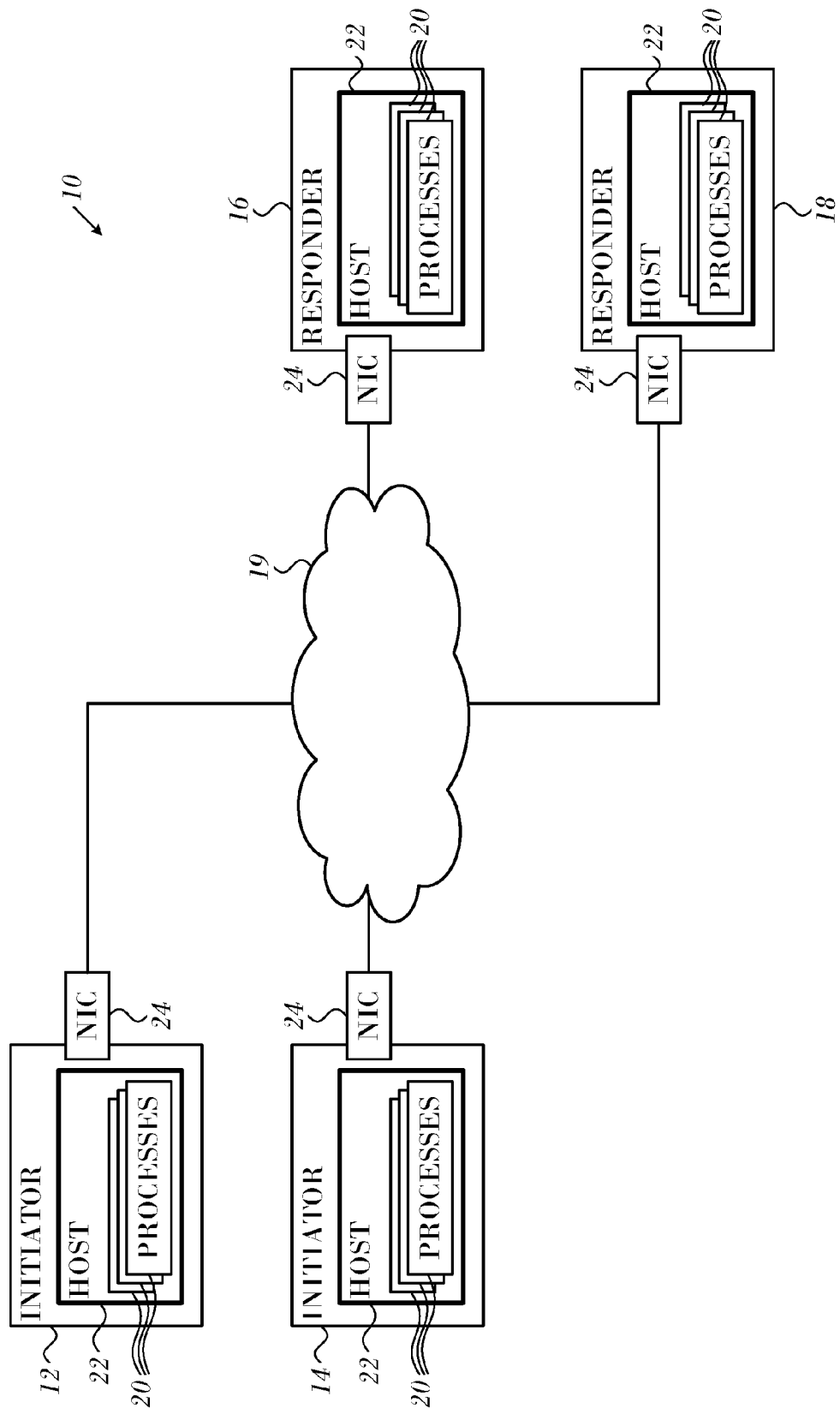
FIG. 1 is a schematic diagram of an exemplary computer system in which the principles of the invention are applied.

Reference is now made to FIG. 1, which schematically illustrates an exemplary computer system 10 in which the principles of the invention are applied. The system 10 is configured for use in an InfiniBand fabric, but may be adapted for other networks by those skilled in the art. System 10 comprises nodes 10, 12, 14, 18, which are interconnected by a packet network 19, such as an InfiniBand switch fabric. In the pictured embodiment, node 12 is an initiator node for a collective operation, while nodes 14, 16, 18 are responder nodes, but typically any given node may be both an initiator and a responder concurrently.

Figure 2:
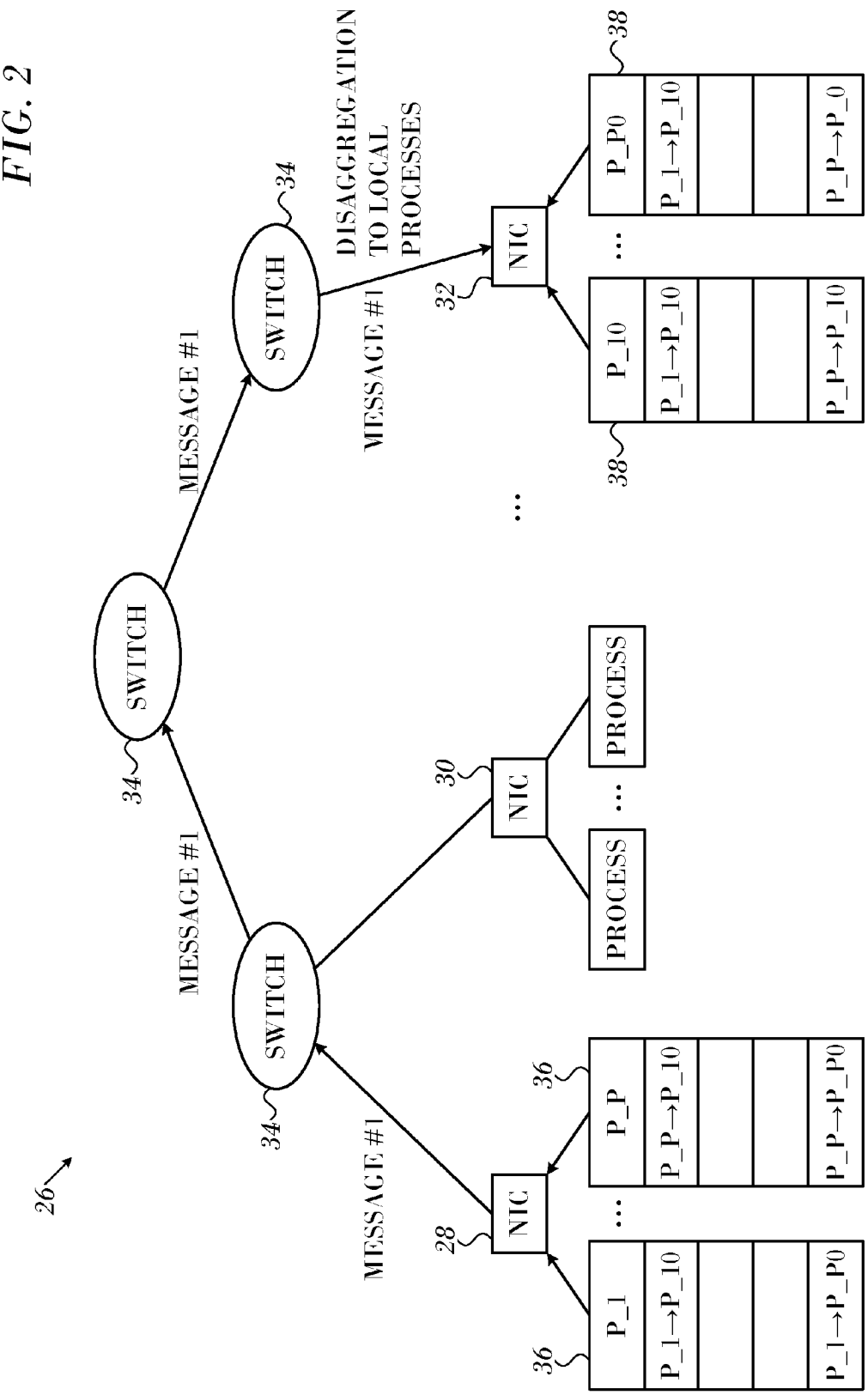
FIG. 2 is a block diagram illustrating message aggregation and disaggregation by NICs in a fabric in accordance with an embodiment of the invention.

Reference is now made to FIG. 2, which is a block diagram illustrating message aggregation and disaggregation by NICs in a fabric 26 in accordance with an embodiment of the invention. The fabric 26 comprises a collective-initiating NIC 28, together with NICs 30, 32 and switches 34. Processes 36 (P_1 through P_P) execute in the host (not shown) of the NIC 28. NIC 28 is informed and keeps track of different communicators created in an MPI job. Other hosts similarly execute processes, including processes 38 in the host of responding NIC 32.

Figure 3:
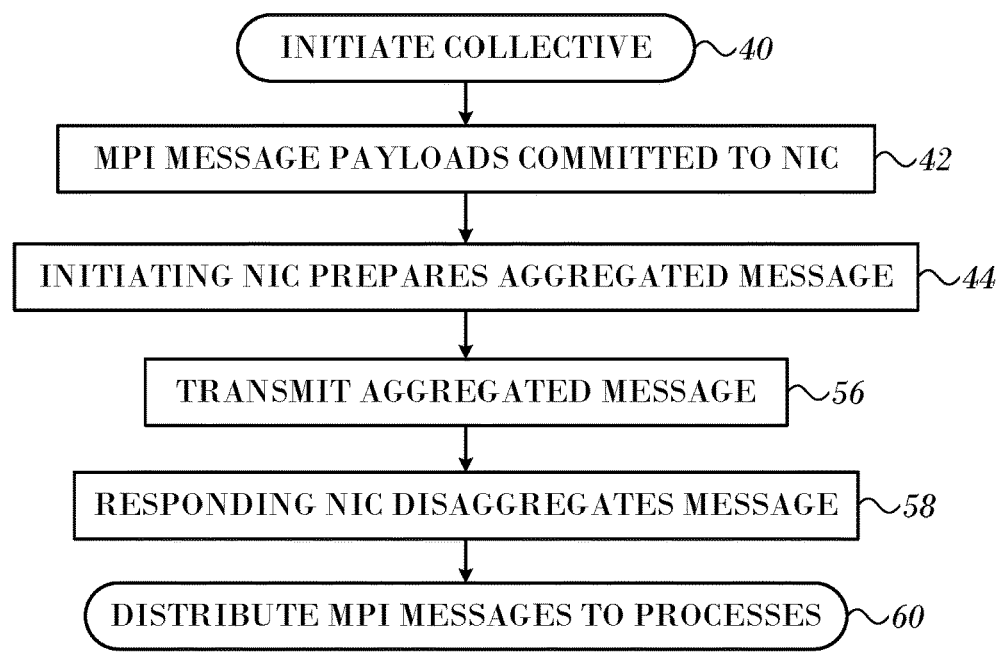
FIG. 3 is a flow chart of a method of transmitting collectives through a fabric in an MPI job in accordance with an embodiment of the invention.

Reference is now made to FIG. 3, which should be read in conjunction with FIG. 2. FIG. 3 is a flow chart of a method of transmitting collectives through a fabric in an MPI job in accordance with an embodiment of the invention. The process steps are shown in a particular linear sequence for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 40 an MPI alltoall or alltoallv collective operation is initiated by the host (not shown) of NIC 28. Next, at step 42 processes 36 (P_1 through P_P) commit their entire payloads to NIC 28. The payloads in this context are composed of all of the messages (including MPI headers) originated by the processes 36 to other processes in the communicator. These messages are referred to herein as "MPI messages".

Figure 4:
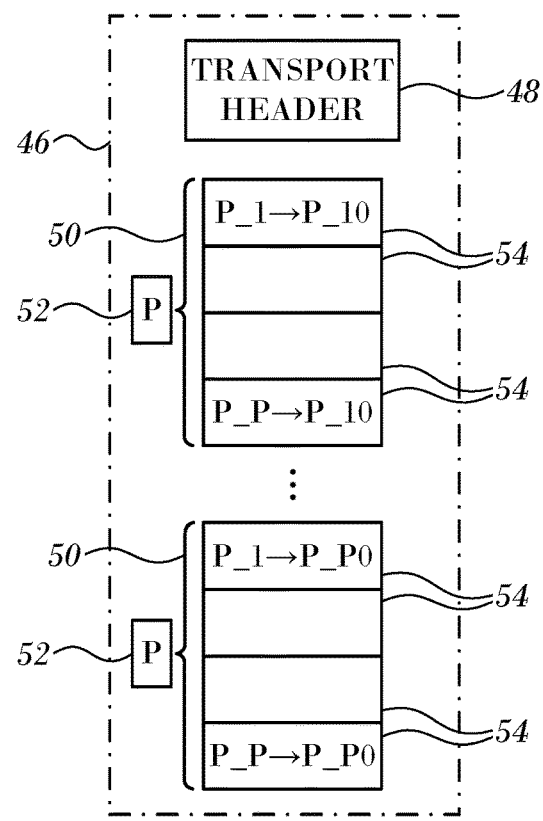
FIG. 4 is a block diagram illustrating an aggregated message in accordance with an embodiment of the invention.

After all local processes in the communicator have committed their alltoall payloads, at step 44 NIC 28 assembles a single message to each of the nodes in the communicator, referred to herein as an aggregated message. Reference is now made to FIG. 4, which is a block diagram illustrating an aggregated message 46 in accordance with an embodiment of the invention. The aggregated message 46 comprises a transport header 48, which specifies a destination address using a local identifier (LID). The aggregated message 46 also contains any number of MPI messages 50, each having an MPI header 52 with fields 54 that specify the processes of the relevant communicator that are relevant to the MPI messages 50. One way to create the aggregated message 46 is to traverse the alltoall payload and to aggregate all MPI messages that have the same destination address (LID).

Reverting to FIG. 2 and FIG. 3, at step 56 the NIC 28 transmits the aggregated message 46 into the fabric, through the switches 34 toward its destination, designated by the LID as NIC 32 When the NIC 32 receives the aggregated message 46, at step 58 it disaggregates the aggregated message into individual MPI messages 50, and at final step 60 distributes the MPI messages 50 to their corresponding processes 38. Each of the processes 38 receives that component of the aggregated message 46 that pertains to it.

Figures 5, 6:
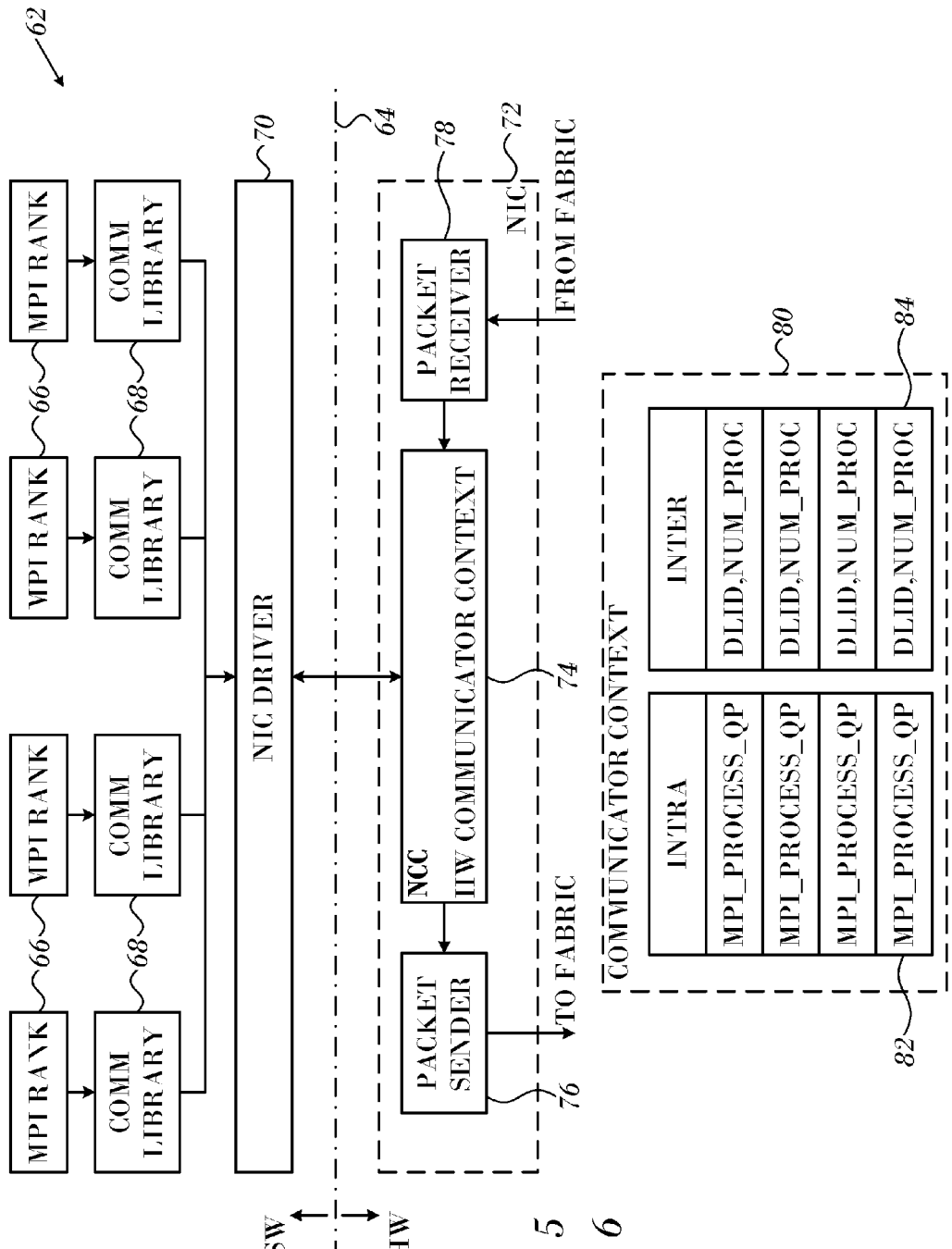
FIG. 5 is a block diagram of a node in a fabric, which is configured for assembling and processing aggregated messages in accordance with an embodiment of the invention.
FIG. 6 is a table illustrating an exemplary communicator context, in accordance with an embodiment of the invention.

Reference is now made to FIG. 5, which is a block diagram of a node 62 in a fabric, configured for assembling and processing aggregated messages in accordance with an embodiment of the invention. Elements above a broken line 64 are typically located in a host computer, while elements below the line 64 may be implemented in a network element, such as a network interface card. Although the node 62 is shown as comprising a number of separate functional blocks, these blocks are not necessarily separate physical entities, but rather represent different computing tasks or data objects stored in a memory that is accessible to a processor. These tasks may be carried out in software running on a single processor, or on multiple processors. The software may be embodied on any of a variety of known non-transitory media for use with a computer system, such as a diskette, or hard drive, or CD-ROM. The code may be distributed on such media, or may be distributed to the node 62 from the memory or storage of another computer system (not shown) over a network. Alternatively or additionally, the node 62 may comprise a digital signal processor, field programmable gate array or hard-wired logic. The node 62 is described with respect to an InfiniBand implementation, but can be applied to other network communications standards, mutatis mutandis.

Any number of MPI processes 66 execute in the node 62. In this example all the MPI processes 66 are members of the same communicator. Instances of a communication software library 68 translate MPI commands of the MPI processes 66 into corresponding driver commands for a NIC driver 70. In an InfiniBand implementation, the MPI processes 66 translate the MPI commands into InfiniBand verb functions. The NIC driver 70 itself is a software library, which translates the driver commands issued by the library 68 into hardware commands that are acceptable to a network interface card 72. In an InfiniBand implementation the commands may be work queue elements (WQEs). Data aggregation and disaggregation (steps 44, 58; FIG. 3) are handled by a NIC communicator controller 74 (NCC) in a hardware communicator context when the node 62 acts as an initiator or responder as the case may be. MPI messages are received from the NIC communicator controller 74 and transmitted into the fabric by a packet sender 76. MPI messages are received from the fabric and delivered to the NIC communicator controller 74 by a packet receiver 78.

Reference is now made to FIG. 6, which is a table 80 illustrating an exemplary communicator context in accordance with an embodiment of the invention. The table 80 assumes an InfiniBand implementation, but as noted above, it can be modified to accommodate other protocols. The table 80 facilitates handling data aggregation and disaggregation by the NIC communicator controller 74 (FIG. 5), and has two columns: an "intra section" 82 and an "inter section" 84. Entries in the intra section 82 are local MPI processes, including the queue pair (QP) that is assigned to each MPI process. Each MPI process commits its alltoall payload by writing a WQE to its local queue pair. Entries in the inter section 84 are destination addresses (DLID) of nodes having processes that are pertain to the communicator. Each DLID entry holds the number of MPI processes for that LID. The inter section 84 is used to send the alltoall payload from the local MPI processes to the different DLIDs.

Figure 7:
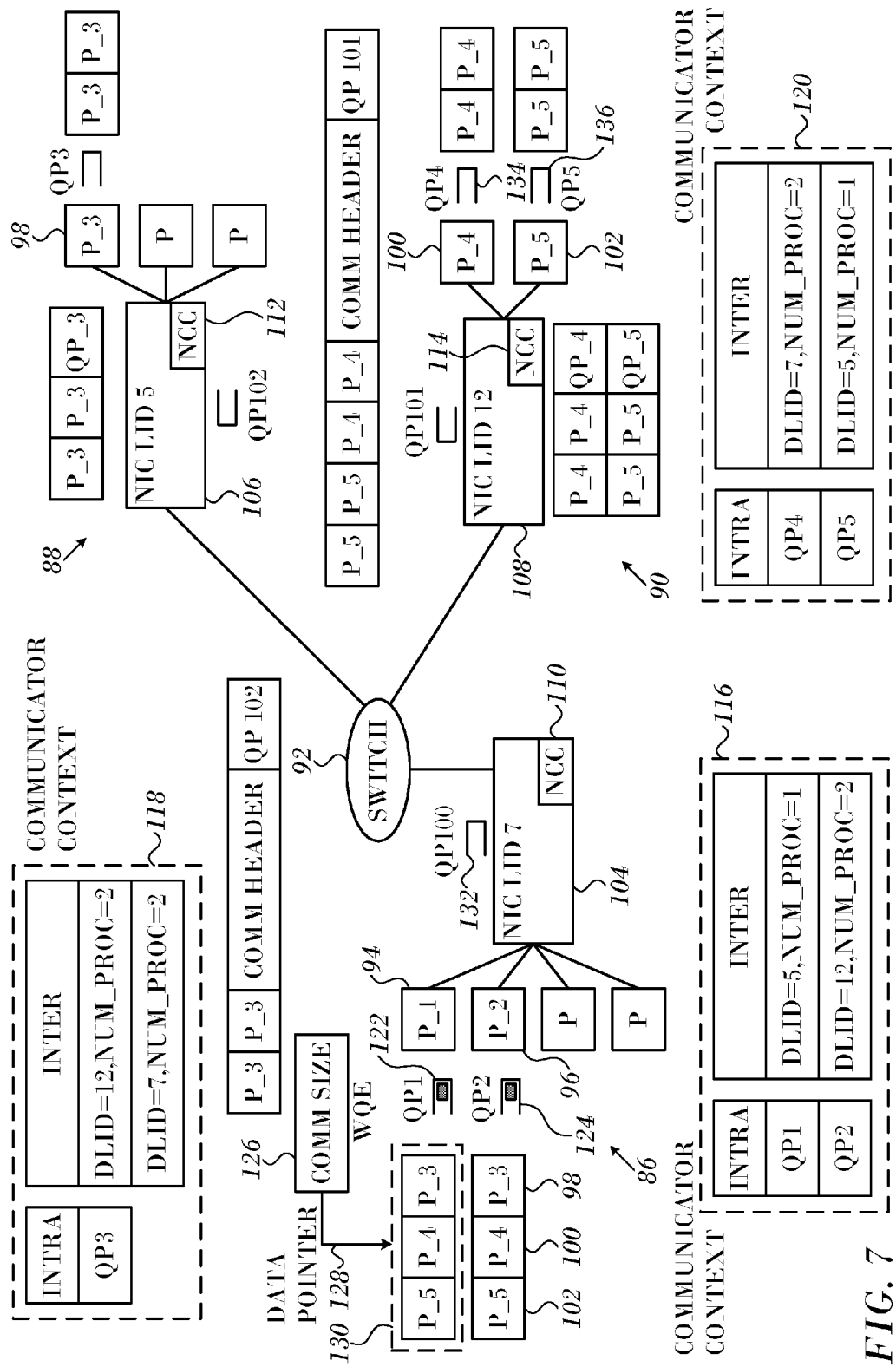
FIG. 7 is a detailed block diagram illustrating a process of alltoall aggregation and disaggregation in accordance with an embodiment of the invention.

Reference is now made to FIG. 7, which is a detailed block diagram illustrating a process of alltoall aggregation and disaggregation in accordance with an embodiment of the invention. Three fabric nodes 86, 88, 90 are connected to switch 92. Processes 94, 96 execute in a host (not shown) of NIC 104. Process 98 (P_3) executes in a host (not shown) of NIC 106, and processes 100, 102 (P_4, P_5) execute in a host (not shown) of NIC 108. All the processes 94, 96, 98, 100, 102 share the same communicator. LIDS (labeled LID 5, LID 7, LID 12) are found in NICs 104, 106, 108. NICs 104, 106, 108 have NCCs 110, 112, 114, and communicator contexts 116, 118, 120, respectively. NIC 104 is associated with queue pair 122, 124 (Qp 1; Qp 2). A work queue element 126 associated with queue pair 122 is established and includes a data pointer 128 to alltoall data (represented by a block 130). NIC 104 may also generate another queue pair 132 (Qp100), whose function is explained below. NIC 108 is associated with queue pairs 134(Qp 4), 136 (Qp 5).

Figure 8:
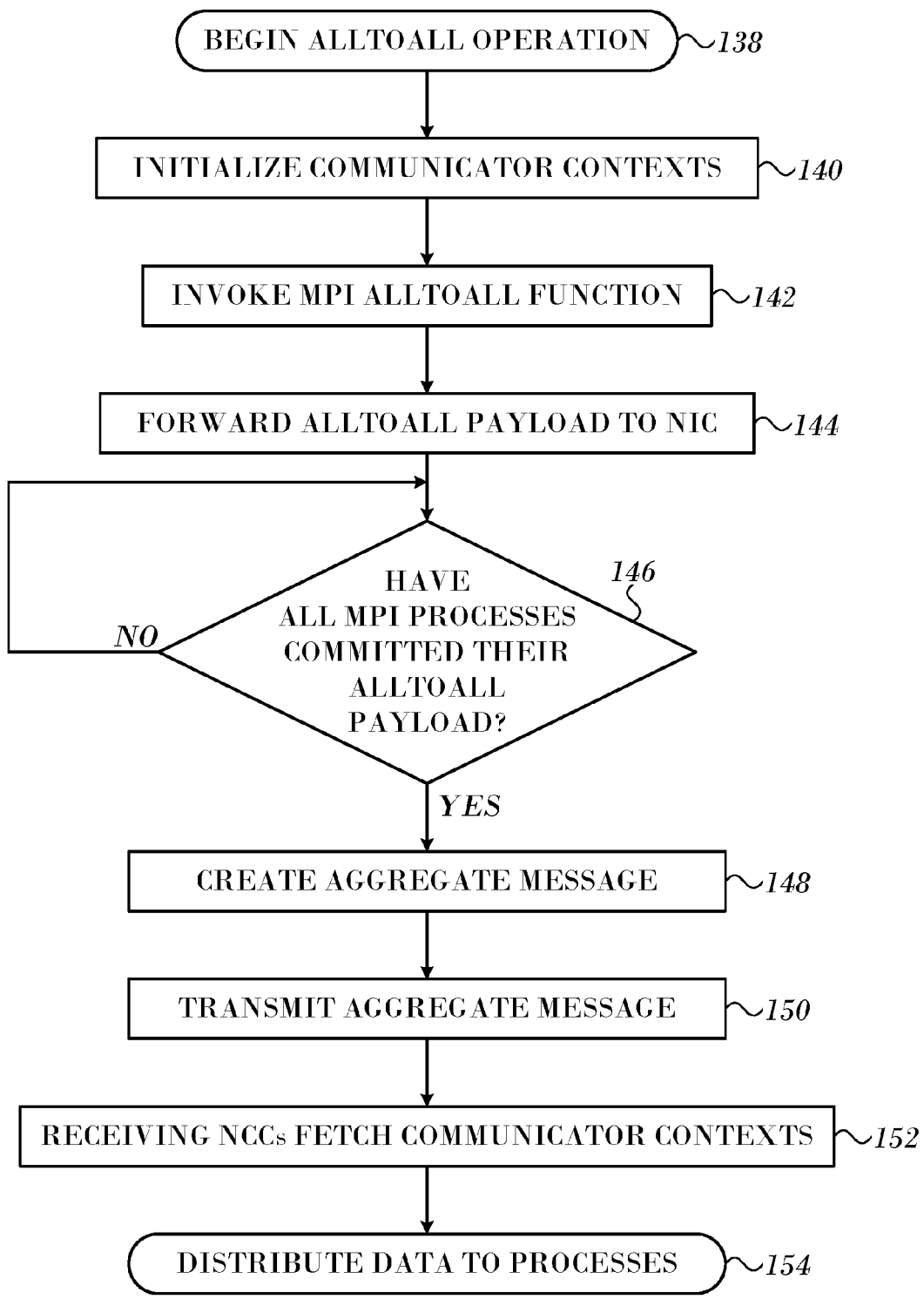
FIG. 8 is a flow chart of the process of alltoall aggregation and disaggregation shown in FIG. 7 in accordance with an embodiment of the invention.

Reference is now made to FIG. 8, which is a flow chart of the process of alltoall aggregation and disaggregation shown in FIG. 7 in accordance with an embodiment of the invention. At initial step 138 an alltoall operation is begun.

Next, at step 140 the communicator contexts 116, 118, 120 are initialized on their respective NICs 104, 106, 108, with the corresponding fields that describe the communicator and are associated with respective queue pairs. For example, on LID 7 in NIC 104, the local MPI process queue pairs are queue pairs 122, 124 and the remote LIDs are LID 5 and LID 12 in NIC 106 108, respectively. LID 12 in NIC 108 contains two MPI processes 100, 102.

Next, at step 142 the MPI alltoall function is invoked by all of the local MPI processes of the node 86.

Next, at step 144 the communicator and the alltoall payload are forwarded to the NIC 104 by the communication library. In an Infiniband implementation, step 144 is comprises posting work queue element 126 to queue pair 122, 124, which, as noted above, includes data pointer 128 to the payload data in block 130. In the example of FIG. 7, process 94 (P_1) has an alltoall payload for processes 98, 100, 102 (P_3-P_5), which is accessed in the NIC 104 using data pointer 128.

Next, at delay step 146 the NCCs 110, 112, 114 in the NICs 104, 106, 108 wait for all of the MPI processes to commit their alltoall payloads. For example, NIC 104 waits for queue pair 122, 124 to post the work queue element 126.

After all local processes have committed their data, at step 148 the NCC 110 assembles the data pointers and creates a single aggregated message, which is directed to the LIDS in the remote NICs 106, 108 according to the communicator context. The NCC 110 is aware of the organization of the alltoall data, and thus which data belong to which LID. In an InfiniBand implementation, the NCC 110 may use a different queue pair from the queue pairs of the local processes to transmit the data. The NCC 110 may also add an extra header to the aggregated message in order to identify the communicator on which the alltoall operation is performed.

In the above example, queue pair 132 is used to send the data, and the message transfer comprises two messages: one message to LID 5 in NIC 106 containing alltoall data for remote process 98 and one message to LID 12 in NIC 108 containing alltoall data for the remote process 100, 102.

The aggregated message is transmitted at step 150 When the aggregated message arrives at its destinations, the communicator contexts 118, 120 are fetched again at step 152 by the receiving NCCs 112, 114, respectively. The NCCs 112, 114 are aware of the order of the alltoall payload of the aggregated message.

Then, at final step 154 the NCCs 112, 114 disaggregate the aggregated message and scatter the data to the MPI processes according to the communicator contexts 118, 120, respectively. In above example, the NCC 114 in NIC 108 breaks the message into two parts, and scatters the first half to queue pair 134 (Qp 4) and the second half to queue pair 136 (Qp 5).

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication, comprising the steps of:
executing a group of processes in a fabric of nodes comprising Network Interface Controllers (NICs), the NICs having respective NIC Communicator Controllers (NCCs);
transmitting messages from all the processes to all the processes of the group of processes via the NICs by performing a Message Passing Interface (MPI) collective operation, wherein the nodes of the fabric function concurrently as initiator nodes executing respective initiator processes and as responder nodes executing respective responder processes, and wherein the collective operation comprises transmitting MPI messages through the fabric from all the initiator processes to all of the responder processes;
with the NCCs of the initiator nodes combining respective payloads of the MPI messages to form an aggregated MPI message;
transmitting the aggregated MPI message through the fabric to the responder nodes;
in respective NCCs of the responder nodes disaggregating the aggregated MPI message into individual messages; and
distributing the individual messages to the responder processes.

2. The method according to claim 1, wherein the aggregated MPI message has exactly one transport header that comprises a destination address of the aggregated MPI message.

3. The method according to claim 1, wherein the MPI messages comprise respective MPI headers comprising designations of the responder processes, wherein the responder processes are referenced in an MPI communicator object.

4. The method according to claim 3, wherein the MPI collective operation comprises forwarding by a communication library the MPI communicator object and the payloads to the NICs of the initiator nodes.

5. The method according to claim 1, further comprising:
maintaining a communicator context in the NCCs of the initiator nodes, wherein transmitting the aggregated MPI message comprises directing the aggregated MPI message to local identifiers (LIDs) in the responder nodes according to the communicator context.

6. The method according to claim 1, comprising forming the aggregated MPI message by assembling pointers to message data, and including respective local identifier addresses for the message data in the aggregated MPI message.

7. An apparatus of communication, comprising:
a fabric of nodes configured for executing a group of processes;
respective network interface controllers (NICs) in the nodes; and
respective NIC Communicator Controllers (NCCs) in the NICs,
wherein the nodes are operative for transmitting messages from all the processes to all the processes of the group of processes via the NICs by performing a Message Passing Interface (MPI) collective operation, wherein the nodes of the fabric function concurrently as initiator nodes executing respective initiator processes and as responder nodes executing respective responder processes, and wherein the collective operation comprises transmitting MPI messages through the fabric from all the initiator processes to all of the responder processes; and
wherein the NCCs of the initiator nodes are configured for combining respective payloads of the MPI messages to form an aggregated MPI message, and the NCCs of the responder nodes are configured for disaggregating the aggregated MPI message into individual messages, and wherein the responder nodes are operative for distributing the individual messages to the responder processes.

8. The apparatus according to claim 7, wherein the aggregated MPI message has exactly one transport header that comprises a destination address of the aggregated MPI message.

9. The apparatus according to claim 7, wherein the MPI messages comprise respective MPI headers containing designations of the responder processes, wherein the responder processes are referenced in an MPI communicator object.

10. The apparatus according to claim 9, wherein the MPI collective operation comprises forwarding by a communication library the MPI communicator object and the payloads to the NCCs of the initiator nodes.

11. The apparatus according to claim 7, wherein the first communicator controller circuitry is operative for forming the aggregated MPI message by assembling pointers to message data, and including respective local identifier addresses for the message data in the aggregated MPI message.

12. The apparatus according to claim 7, wherein the NCCs are operative for maintaining a communicator context and transmitting the aggregated MPI message by directing the aggregated MPI message to local identifiers (LIDs) in the responder nodes according to the communicator context.

* * * * *